United States Patent
Amatucci et al.

(10) Patent No.: US 6,432,581 B1
(45) Date of Patent: Aug. 13, 2002

(54) RECHARGEABLE BATTERY INCLUDING AN INORGANIC ANODE

(75) Inventors: Glenn G. Amatucci, East Brunswick, NJ (US); Jean-Marie Tarascon, Amiens Cedex (FR)

(73) Assignee: Telcordia Technologies, Inc., Morristown, NJ (US)

( * ) Notice: Subject to any disclaimer, the term of this patent is extended or adjusted under 35 U.S.C. 154(b) by 0 days.

(21) Appl. No.: 09/568,970

(22) Filed: May 11, 2000

(51) Int. Cl.$^7$ ................................................. H01M 4/50
(52) U.S. Cl. ............... 429/224; 429/231.95; 429/218.1; 423/599
(58) Field of Search ........................ 429/231.95, 231.9, 429/224, 218.1, 229; 423/592, 605, 179, 599

(56) References Cited

U.S. PATENT DOCUMENTS

| | | | | |
|---|---|---|---|---|
| 5,196,279 A | * | 3/1993 | Tarascon | 429/194 |
| 5,370,949 A | * | 12/1994 | Davidson et al. | 429/224 |
| 5,571,637 A | * | 11/1996 | Idota | 429/218 |
| 5,639,438 A | * | 6/1997 | Ellgen | 423/594 |
| 5,707,756 A | * | 1/1998 | Inoue et al. | 429/57 |
| 5,789,112 A | * | 8/1998 | Ellgen | 429/223 |

* cited by examiner

*Primary Examiner*—Stephen Kalafut
*Assistant Examiner*—R. Alejandro
(74) *Attorney, Agent, or Firm*—David A. Hey

(57) ABSTRACT

The present invention relates to secondary lithium batteries which include inorganic compound for the negative electrode and a cathode compound for the positive electrode which comprises $Li_2Mn_{2-x}Me_xO_{4-z}F_z$ wherein $0 \leq X \leq 0.5$ and can be optimized to match the irreversible capacity loss associated with a chosen inorganic negative electrode; $0 \leq Z \leq 0.5$; and Me is selected from the group consisting of Al, Cr, Zn, Co, Ni, Li, Mg, Fe, Cu, Ti, Si or combinations thereof. In addition, the present invention relates to rechargeable plastic lithium ion batteries having a positive electrode, a negative electrode, and a separator element arranged between the electrodes, wherein the positive electrode includes an intercalation compound of $Li_2Mn_{2-x}Me_xO_{4-z}F_z$ as set forth above and the negative electrode includes an active inorganic compound.

10 Claims, 2 Drawing Sheets

RECHARGEABLE BATTERY INCLUDING AN INORGANIC ANODE

FIELD OF THE INVENTION

The present invention relates to secondary lithium batteries. More particularly, the present invention relates to secondary or rechargeable lithium batteries using a lithium intercalation positive electrode (cathode) and a lithium intercalated negative electrode (anode).

BACKGROUND OF THE INVENTION

Secondary lithium batteries using an intercalation compound as cathode and free lithium metal as anode were studied extensively during the 1980's and 1990's. These studies revealed the inherent dangers of using free lithium and precluded the commercial viability of such batteries. However, substitution of other intercalation compounds for the free lithium metal have proved to be successful.

These successful secondary lithium batteries have focused on the concept of a "rocking chair battery", which utilize a lithiated intercalation compound as the cathode and a lithium intercalation compound as the anode. Upon charge of such a battery, the lithium deintercalates from the cathode and then intercalates with the anode. During discharge, the lithium flows in the opposite direction from anode to cathode. In other words, the lithium ions are "rocked" back and forth during the charge-discharge cycle.

Because of loss of lithium associated with irreversible secondary reactions in these lithium batteries, an excess of lithium is necessary. This excess lithium may be provided by using an excess of cathode material, however, this results in a significant loss of battery capacity. Alternatively, a stable lithium based cathode containing more than one lithium atom per unit formula may be used.

Prior art cells utilized an $LiCoO_2$ or an $LiNiO_2$ cathode material, which have only one lithium ion per unit formula and therefore suffer from the loss of lithium noted above. There is no known $Li_xCoO_2$ phase in which x is greater than one. Further, the instability in air of $Li_{1+x}NiO_2$ prevents the use of this phase as the cathode material.

In light of the above deficiencies with respect to $LiCoO_2$ and $LiNiO_2$ cathode materials, U.S. Pat. No. 5,196,279 suggested use of lithium manganese oxide cathode materials and particularly, $LiMn_2O_4$ and $Li_2Mn_2O_4$ cathode materials.

The use of $Li_2Mn_2O_4$ as the cathode material is particular advantageous as it provides the excess lithium needed to overcome the loss caused by the irreversible reactions noted above. The '279 patent relates solely to the use of a carbon anode which was the standard at the time and continues to be so. However, it is believed that in the next few years, carbon anodes will be replaced with inorganic electrode materials. These inorganic materials will have a large amount of irreversible lithium loss associated with their use as the anode material. Therefore, there is a need in the art to provide for excess lithium in secondary lithium batteries utilizing inorganic anode compounds.

SUMMARY OF THE INVENTION

In accordance with the present invention, secondary lithium batteries include a lithiated intercalation cathode compound and an inorganic compound for the negative electrode. The cathode compound comprises $Li_2Mn_{2-x}Me_xO_{4-z}F_z$ wherein $0 \leq X \leq 0.5$ and can be optimized to match the irreversible capacity loss associated with a chosen inorganic negative electrode and wherein $0 \leq Z \leq 0.5$ and wherein Me is selected from the group consisting of Al, Cr, Zn, Co, Ni, Li, Mg, Fe, Cu, Ti, Si or combinations thereof. In a preferred embodiment, the cathode compound comprises $Li_2Mn_2O_4$.

The present invention further provides a rechargeable lithium battery comprising a positive electrode, a negative electrode, an electrically conductive collector associated with at least one electrode, a separator element arranged between the electrodes, wherein the positive electrode includes an intercalation compound of $Li_2Mn_{2-x}Me_xO_{4-z}F_z$ as set forth above and the negative electrode includes an active inorganic compound.

DESCRIPTION OF THE INVENTION

The present invention is directed to rechargeable lithium batteries which include a cathode material of $Li_2Mn_{2-x}Me_xO_{4-z}F_z$ (wherein $0 \leq X \leq 0.5$; $0 \leq Z \leq 0.5$; and Me is selected from the group consisting of Al, Cr, Zn, Co, Ni, Li, Mg, Fe, Cu, Ti, Si or combinations thereof) and an inorganic anode material. The present invention is also directed to plastic lithium ion batteries having polymeric positive and negative electrode layers separated by a polymeric separator layer. The positive electrode layer includes the $Li_2Mn_{2-x}Me_xO_{4-z}F_z$ active compound while the negative electrode layer includes an inorganic active compound.

Figure 1:
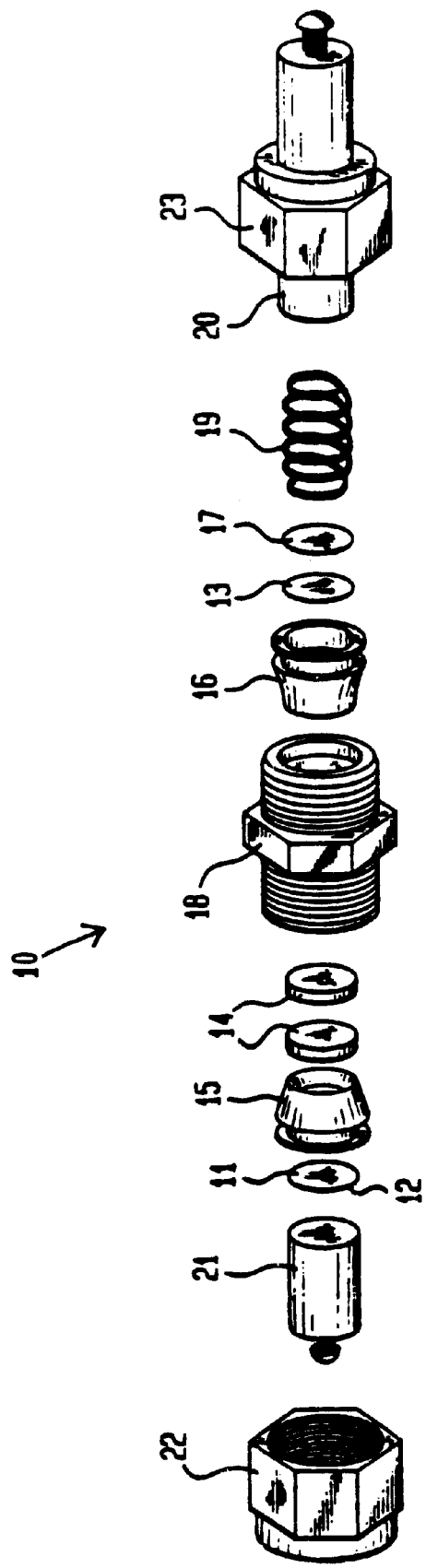
FIG. 1 is an exploded view of a secondary lithium cell in accordance with one embodiment of the present invention.

FIG. 1 is an exploded view of a secondary lithium cell 10, in accordance with one embodiment of the present invention. In particular, FIG. 1 shows a cathode 11, disposed on a quartz substrate 12, an anode 13, and glass paper 14, which has been imbibed with a suitable electrolyte. Appropriate propylene fittings 15, 16, steel disc 17, fitting 18, spring 19, plunger 20, stainless steel rod 21, and cap screws 22 and 23 make up the rest of the cell 10, structure. Upon compression, the fitting provide any airtight ambient for the battery. Insulating layers may be inserted between the plunger 20 and battery fitting 18, to prevent electrical contact.

Figure 2:
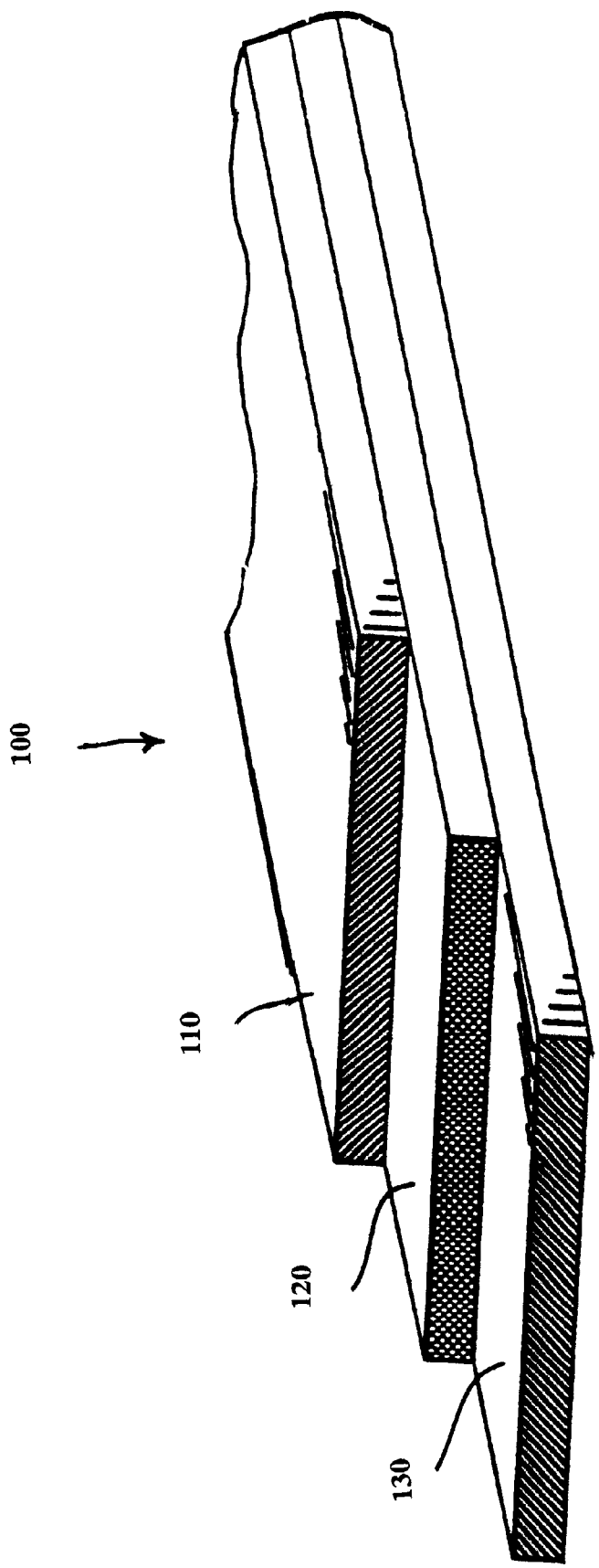
FIG. 2 is a diagrammatic representation of a rechargeable plastic lithium ion battery in accordance with another embodiment of the present invention.

FIG. 2 is a diagrammatic representation of a rechargeable plastic lithium ion battery 100, in accordance with the present invention, having a positive electrode layer 110, a negative electrode layer 120, and a separator layer 130.

In the plastic battery according to the present invention, flexible polymeric compositions which may be used for the solid state portion of either the positive or and negative electrode layer, as well as the separator layer may be selected from, for example, copolymers of vinylidene fluoride (VdF) and hexafluoropropylene (HFP), PVC, PAN and the like. More particularly, the polymer may be selected from polymers and copolymers of vinyl chloride, vinyl chloride and vinylidene chloride, vinyl chloride and acrylonitrile, acrylonitrile, vinylidene fluoride, vinylidene fluoride with hexafluoropropylene, vinylidene fluoride with hexafluoropropylene and a member of the group consisting of vinyl fluoride, tetrafluoroethylene, an trifluoroethylene.

During formation of the polymer layers of the battery, it is desirable to incorporate a plasticizer into the polymer matrix. The plasticizer will later be substantially removed and replaced with an electrolytic salt. The plasticizer should be at least partially compatible with the polymer matrix to allow for control of melting during the battery formation, and should have a very low vapor pressure to prevent evaporation during handling and storage. The main role of the plasticizer is to impart solvent-presence memory by inducing the formation of a looser, less entangled, and less crystalline structure. In addition, the plasticizer allows the polymeric material to exhibit enhanced swelling when contacted with a liquid electrolyte solution, preferably following the removal of at least a portion of the plasticizer.

Plasticizers for use in the present invention include, for example, dibutyl phthalate, dimethyl phthalate, diethyl phthalate, tributoxyethyl phosphate, propylene carbonate, ethylene carbonate, trimethyl trimellitate, mixtures of these, and the like.

Inorganic fillers, such as fumed silica or silanized fumed silica may also be incorporated into the polymeric material making up the solid state components of the battery, i.e., both electrodes and separator layers. These fillers enhance the physical strength and melt viscosity of the component and, in some compositions, increase the subsequent level of electrolyte solution absorption.

In accordance with the present invention, the active material for inclusion in the cathode or positive electrode is $Li_2Mn_{2-x}Me_xO_{4-z}F_z$ as defined above.

Active materials for inclusion in the anode or negative electrode include inorganic materials which undergo the general conversion reduction reaction

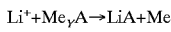

Where Me is a metal, $0.5 \leq Y \leq 4$ depending on the metal chosen and A is O, N, S, or F. This process results in the formation of a metal species within a matrix of LiA which results in associated irreversible capacity loss. Alternatively, the inorganic material may be a metal which alloys with Li such as Al, Zn, Si, Sn or an oxide, sulfide, fluoride or nitride intercalation compound.

For plastic type batteries according to the present invention, the following elements can be formed in the following manner. A terminal layer of aluminum grid may be coated with, or laminated to, an intercalation electrode composition, i.e. a $Li_2Mn_{2-x}Me_xO_{4-z}F_z$ powder in a polymer matrix, to form a positive electrode. A hybrid electrolyte separator layer can then be formed on, or laminated to, the positive electrode from a composition comprising a solution of a copolymer and a plasticizer. Another layer can then be formed on, or laminated to, the positive electrode from a composition comprising a solution of a copolymer and a plasticizer. A copper foil or grid coated with an active inorganic compound, dispersed in a composition of the electrolyte copolymer may then be formed or laminated to the assembly to complete the cell structure. This process lends itself well to a continuous production of battery cells. However, it is preferred that the electrolytic salt not be introduced during the assembly stage because the hygroscopic property thereof imposes extreme limitations on the conditions under which the coating and cell assembly operations are carried out.

Rather than a continuous process, it is preferable to assemble the battery body as described above, wherein the separator membrane and both electrode films are substantially devoid of hygroscopic electrolyte salt. Activation of the battery can then be carried out at a later time as desired. During such final battery activation operation when the condition sensitive electrolyte salt solution is introduced into the battery cell there is a need for maintaining anhydrous conditions, for example an atmosphere of dry, inert gas. When contacted with the assembled battery body the electrolyte salt solution readily migrates through the electrode grid and into the membrane matrix to provide substantially the same conductivity enhancement as can be achieved by a preformed hybrid electrolyte film.

In an alternative embodiment of the present invention, at least one of the Cu or Al current collector is replaced by a plastic matrix containing a preselected amount of a metallic powder which renders the film conductive.

The use of active inorganic materials in the anode composition will result in significant loss of lithium associated with irreversible secondary reactions in the battery cell. Therefore, the use of $Li_2Mn_{2-x}Me_xO_{4-z}F_z$ in accordance with the present invention as the active cathode component becomes very important. By using $Li_2Mn_{2-x}Me_xO_{4-z}F_z$, excess lithium is available in the cell without the need for providing excess material which reduces the capacity of the cell. Further, the stability of $Li_2Mn_{2-x}Me_xO_{4-z}F_z$ increases the suitability for use as the active cathode material.

A preferred embodiment of the present invention utilizes $L_2Mn_2O_4$ as the cathode material, which may be prepared in any suitable manner, but preferably is prepared in accordance with one of the methods set forth in U.S. Pat. 5,266,299. In particular, the $Li_2Mn_2O_4$ may be prepared according to a first alternative procedure as follows:

$LiMn_2O_4$ is prepared according to any common procedure; e.g. reacting mixed $Li_2CO_3$ and $MnO_2$ powders at about 800° C.;

The $LiMn_2O_4$ powder is then mixed in about a 1:1 weight ratio with LiI powder (i.e. LiI in excess) and placed in an evacuated and sealed ampoule;

The ampoule is then heated at about 150° C. for about 24 hours and the following reaction in which the $LiMn_2O_4$ is reduced by the LiI, takes place:

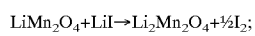

The ampoule is then cooled to room temperature to allow iodine to condense from the reacted material which is then washed with acetonitrile to remove trace amounts of LiI and yield the $Li_2Mn_2O_4$ compound.

In a second alternative procedure, $Li_2Mn_2O_4$ is prepared in accordance with the following method:

$LiMn_2O_4$ powder is mixed with an acetonitrile solution of LiI and heated at about 82° C. for about two days;

The reaction mixture is then filtered and washed with acetonitrile to produce the $Li_2Mn_2O_4$ powder.

In addition, $Li_2Mn_2O_4$ may be prepared by the same processes noted above, but with a substitution of $\lambda$-$MnO_2$ for the $LiMn_2O_4$ starting material.

Other embodiments of the invention will be apparent to those skilled in the art from consideration of the specification and practice of the invention disclosed herein. It is intended that the specification be considered as exemplary only, with a true scope and spirit of the invention being indicated by the following claims.

We claim:

1. A rechargeable battery comprising:

a positive electrode including an active compound comprising $Li_2Mn_{2-x}Me_xO_{4-z}F_z$ wherein $0 \leq X \leq 0.5$; $0 < Z \leq 0.5$; and Me is selected from the group consisting of Al, Cr, Zn, Co, Ni, Li, Mg, Fe, Cu, Ti, Si or combinations thereof;

a negative electrode including an inorganic active compound which reacts with lithium ions; and a separator element arranged between the electrodes.

2. A rechargeable battery according to claim 1, wherein said inorganic active compound is selected from the group of compounds which undergo the general conversion reduction reaction $$Li^+ + Me_yA \rightarrow LiA + Me$$

wherein $0.5 \leq Y \leq 4$ and A is O, N, S, or F.

3. A rechargeable battery according to claim 1, wherein said active inorganic active compound is an element which alloys with Li.

4. A rechargeable battery according to claim 3, wherein said element is selected from the group consisting of Al, Zn, Si, or Sn.

5. A rechargeable battery according to claim 1, wherein said active inorganic active compound is an oxide, sulfide, fluoride or nitride of an intercalation compound.

6. A lithium metal free non-aqueous secondary battery comprising an inorganic anode and a cathode comprising $Li_2Mn_{2-x}Me_xO_{4-z}F_z$ wherein $0 \leq X \leq 0.5$; $0 < Z \leq 0.5$; and Me is selected from the group consisting of Al, Cr, Zn, Co, Ni, Li, Mg, Fe, Cu, Ti, Si or combinations thereof.

7. A rechargeable battery according to claim 6, wherein said inorganic anode is selected from the group of compounds which undergo the general conversion reduction reaction $$Li^+ + Me_yA \rightarrow LiA + Me$$

wherein $0.5 \leq Y \leq 4$ and A is O, N, S, or F.

8. A rechargeable battery according to claim 6, wherein said inorganic anode is an element which alloys with Li.

9. A rechargeable battery according to claim 8, wherein said element is selected from the group consisting of Al, Zn, Si, or Sn.

10. A rechargeable battery according to claim 6, wherein said inorganic anode is an oxide, sulfide, fluoride or nitride of an intercalation compound.

* * * * *